United States Patent
Souza et al.

(10) Patent No.: US 9,972,083 B2
(45) Date of Patent: May 15, 2018

(54) DETECTION OF TOOTH FRACTURES IN CBCT IMAGE

(71) Applicant: Carestream Dental Technology Topco Limited, Atlanta, GA (US)

(72) Inventors: Andre Souza, Webster, NY (US); Lawrence A. Ray, Rochester, NY (US); Alexandre X. Falcao, Campinas (BR)

(73) Assignee: Carestream Dental Technology Topco Limited, London (GB)

( * ) Notice: Subject to any disclaimer, the term of this patent is extended or adjusted under 35 U.S.C. 154(b) by 22 days.

(21) Appl. No.: 13/947,369

(22) Filed: Jul. 22, 2013

(65) Prior Publication Data

US 2014/0314291 A1    Oct. 23, 2014

Related U.S. Application Data

(60) Provisional application No. 61/814,470, filed on Apr. 22, 2013.

(51) Int. Cl.
  *G06T 7/00*   (2017.01)

(52) U.S. Cl.
  CPC .. *G06T 7/0012* (2013.01); *G06T 2207/10081* (2013.01); *G06T 2207/20096* (2013.01); *G06T 2207/30036* (2013.01)

(58) Field of Classification Search
  None
  See application file for complete search history.

(56) References Cited

U.S. PATENT DOCUMENTS

| 5,742,700 A * | 4/1998 | Yoon ................ G06F 19/3487 382/132 |
| 2003/0039389 A1* | 2/2003 | Jones et al. ................ 382/154 |
| 2011/0287387 A1* | 11/2011 | Chen et al. ................ 433/215 |
| 2013/0169639 A1* | 7/2013 | Shi et al. ................ 345/424 |

FOREIGN PATENT DOCUMENTS

| WO | WO 9706505 A1 * | 2/1997 | ........ G06F 19/3487 |
| WO | WO2011101447 | 8/2011 | |

OTHER PUBLICATIONS

Simon, James HS, et al. "Differential diagnosis of large periapical lesions using cone-beam computed tomography measurements and biopsy." Journal of endodontics 32.9 (2006): 833-837.*

Yanagisawa, Ryuichi, and Shinichiro Omachi. "Extraction of 3D shape of a tooth from dental CT images with region growing method." In Computational Forensics, pp. 68-77. Springer Berlin Heidelberg, 2011.*

(Continued)

*Primary Examiner* — Vikkram Bali
*Assistant Examiner* — Tracy Mangialaschi

(57) ABSTRACT

A method for analyzing a subject tooth. The method includes obtaining volume image data including at least the subject tooth and segments the subject tooth from within the volume data according to one or more operator instructions. An index is generated that is indicative of a suspected fracture or lesion identified for the segmented subject tooth. The subject tooth is displayed with the suspected fracture or lesion highlighted. The generated index also displays.

14 Claims, 24 Drawing Sheets

(56) References Cited

OTHER PUBLICATIONS

Mao, Xiaoyang, Lichan Hong, and Arie Kaufman. "Splatting of curvilinear volumes." Proceedings of the 6th conference on Visualization'95. IEEE Computer Society, 1995.*
Chen, Hung-Li Jason, Faramarz F. Samavati, and Mario Costa Sousa. "GPU-based point radiation for interactive volume sculpting and segmentation." The visual computer 24.7-9 (2008): 689-698.*
Gunduz K, Avsever H, Orhan K, çelenk P, Ozmen B, Cicek E, Egrioglu E, Karaçayli Ü. Comparison of intraoral radiography and cone-beam computed tomography for the detection of vertical root fractures: an in vitro study. Oral Radiology. Jan. 1, 2013 ;29(1):6-12.*
Falcao, et. al. "The Image Foresting Transformation: Theory, Algorithm, and Applications," in *IEEE Trans on Pattern Analysis and Machine Intelligence*, 26 (1): 19-29, 2004).
Souza et. al., "Volume rendering in the presence of partial volume effects," *IEEE Trans on Medical Imaging*, 24(2): 223-225, 2005 ).
Paloma, et al. "Cone Beam CT for Diagnosis and Treatment Planning in Trauma Cases", *Dental Clinics of North America*, vol. 53, issue 4, Oct. 2009, pp. 717-727.
Hassan et al. "Detection of Vertical Root Fractures in Endodontically Treated Teeth by a Cone Beam Computed Tomography Scan", *Journal of Endodontics*, May 2009, 35 (5), pp. 719-722.
Patel et al., "New dimensions in endodontic imaging: part 1. Conventional and alternative radiographic systems", *International Endodontic Journal*, 2009, pp. 1-16.
Cotton et al., "Endodontic Applications of Cone-Beam Volumetric Tomography" , *Journal of Endodontics*, Sep. 2007, 33 (9).
Mao, Hong, Kaufman, "Splatting of Curvilinear Volumes" in *Proceedings of the 6th IEEE Visualization Conference*, pp. 61-68. 1995.
Commonly assigned U.S. Appl. No. 13/422,145, Interactive 3-D Examination of Root Fractures, Souza et al., filed Mar. 16, 2012.

* cited by examiner

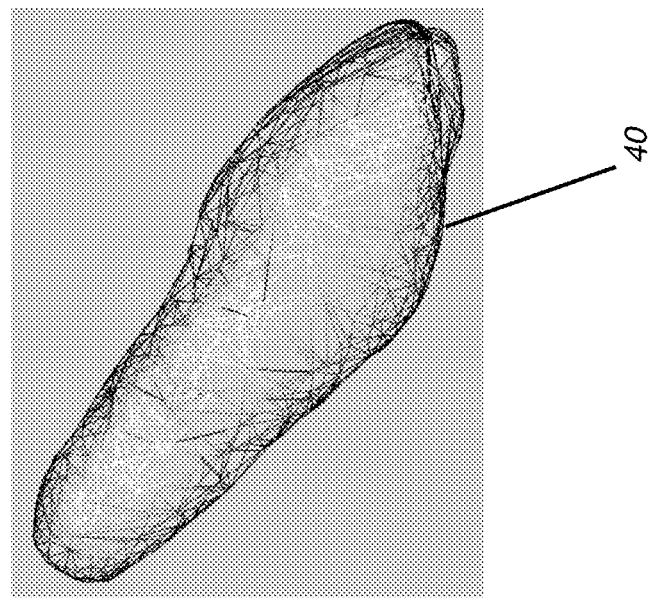
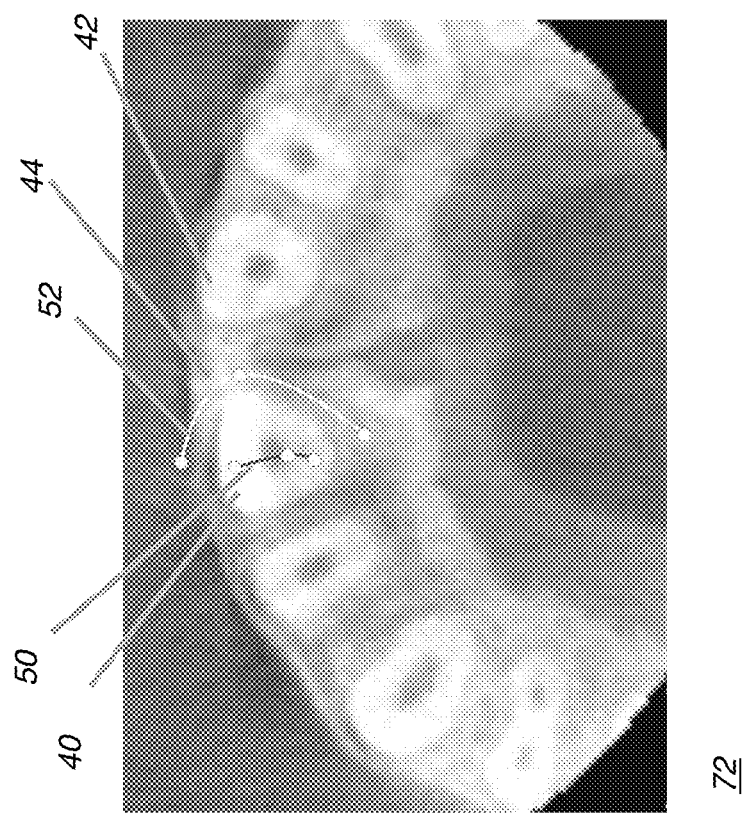
FIG. 3B
FIG. 3A

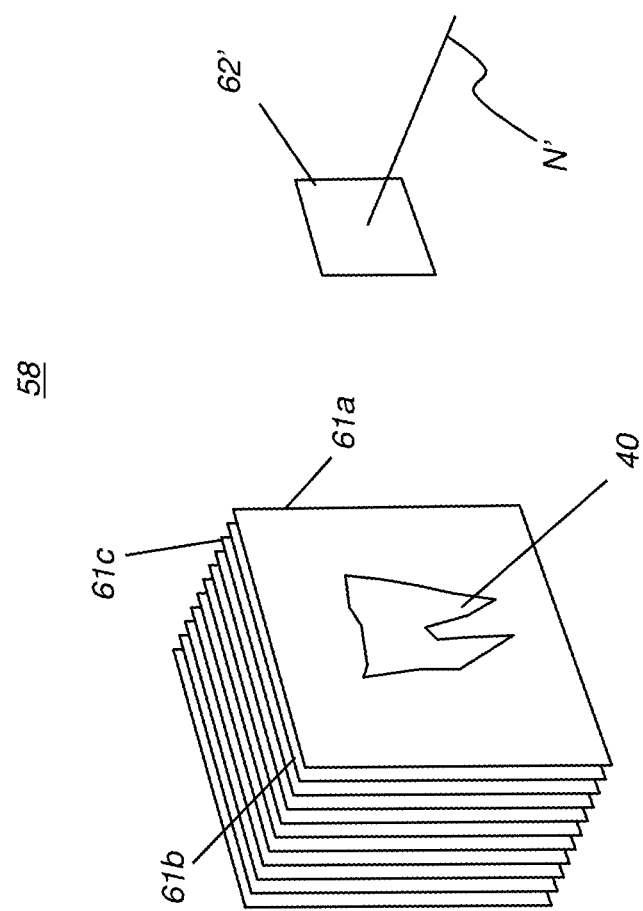

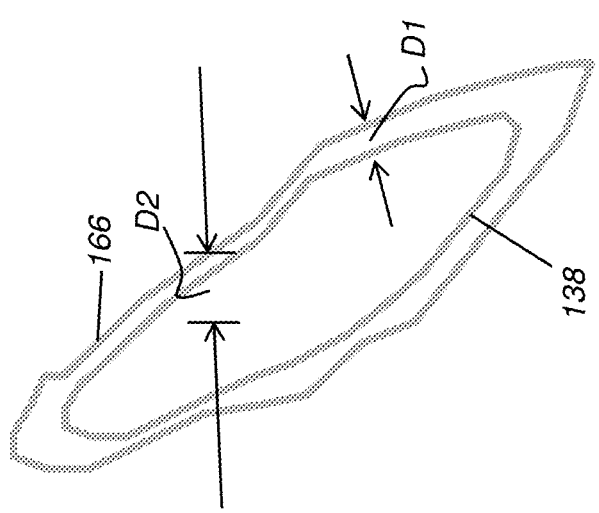

DETECTION OF TOOTH FRACTURES IN CBCT IMAGE

CROSS REFERENCE TO RELATED APPLICATIONS

This application claims priority to U.S. Ser. No. 61/814,470, provisionally filed on Apr. 22, 2013, entitled "DETECTION OF TOOTH FRACTURES IN CBCT IMAGE", in the name of Souza et al., incorporated herein in its entirety.

FIELD OF THE INVENTION

The invention relates generally to dental imaging, and in particular to a radiographic imaging apparatus for viewing volume images having highlighted fracture information for teeth.

BACKGROUND

Cone beam computed tomography (CBCT) is an X-ray imaging modality capable of acquiring three-dimensional information from the human anatomy with a lower radiation dose to the patient as compared to conventional medical computed tomography (CT) systems. Cone beam CT systems capture volumetric data sets by using a high frame rate digital radiography (DR) detector and an x-ray source. The detector and source are typically affixed to a gantry that rotates about the subject to be imaged, with the source directing, from various points along its orbit around the subject, a divergent cone beam of x-rays toward the subject. The CBCT system captures projections at rotation locations, for example, one 2-D projection image at every degree of rotation. The projections are then reconstructed into a 3D volume image using various techniques. Known methods for reconstructing the 3-D volume image include filtered back projection approaches.

One area for CBCT use is endodontics. In conventional practice, detection of a problem responsive to endodontic treatment begins with the patient's report of pain. The practitioner works with the patient to isolate the suspect tooth and may obtain one or more two-dimensional (2-D) periapical radiographs to help identify any abnormalities of the root structure and surrounding bone structure. In some situations, visual inspection of the 2-D image can help to identify the problem. However, detection of some types of conditions remains a challenge with conventional 2-D images. For example, some types of vertical root fracture (VRF) can be difficult to detect in the periapical image. Vertical root fracture is a type of tooth fracture that affects the root, causing pain due to infection and inflammation and often necessitating tooth extraction.

CBCT imaging and its capability for displaying low contrast tissue regions makes CBCT a technology for assessment of VRF and other endodontic conditions. This includes use of CBCT imaging to support root canal therapy, as shown in the sequence of FIG. 1. In this type of treatment, an infected tooth 20 has an abscess 22 to be treated. An opening 24 is made in tooth 20 and a tool 28 is used to access and remove infected material. A plugger 30 then fills root portions of tooth 20 with gutta percha or other suitable material. The tooth 20 can be repaired with a filling 34 or a crown 36 that is fitted onto a post 38 inserted by the practitioner.

While CBCT imaging can be used to improve detection of VRF and other conditions requiring endodontic treatment or other types of treatment, however, difficulties remain. Manipulating the CBCT image can be challenging, particularly for practitioners/technicians who are new to volume imaging technology. Isolating the particular views that most distinctly reveal the problem condition can be difficult or frustrating for the practitioner, burdening the user with a time commitment for training and for using the CBCT system.

Computer-aided diagnostics (CAD) systems have been used, with the goal of analyzing image contents and identifying suspected root fractures or other lesions for display to the operator. Such systems have had some success, but there is room for improvement. Existing systems typically provide minimal interaction with the user, making it difficult to determine the likelihood or severity of a condition. The relative number of false negative and false positive indications provided from these systems makes it difficult for the practitioner to verify the results of the automated analysis. The 3-D perspective view can be limited in function and difficult to operate.

Thus, there is a need for an interactive user/operator/practitioner interface that provides accurate reporting of VRF and/or other problems, provides image manipulation tools that can be quickly learned, and provides an intuitive viewer experience, allowing the user to make effective use of CBCT imaging for endodontic applications.

SUMMARY OF THE INVENTION

Features offered by the present invention promote the art of dental imaging, particularly for volume imaging, allowing interactive examination of image content from teeth and their root structures.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

In accordance with one embodiment, there is a method for analyzing a subject tooth. The method comprises: obtaining volume image data including at least the subject tooth; segmenting the subject tooth from within the volume data according to one or more operator instructions; generating an index that is indicative of a suspected fracture or other lesion identified for the segmented subject tooth; and displaying the subject tooth with the suspected fracture or other lesion highlighted and displaying the generated index.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 3A is a plan view that shows an image and markings that provide operator instructions for tooth segmentation.

FIG. 3B is a plan view showing a segmented tooth of interest from operator markup as provided in FIG. 3A.

FIGS. 4A and 4B are schematic views that show arrangement of slices at alternate angles for the same volume image content.

FIG. 14B is a schematic diagram that shows how the curvilinear shell is defined according to an embodiment of the present invention.

Figure 1:
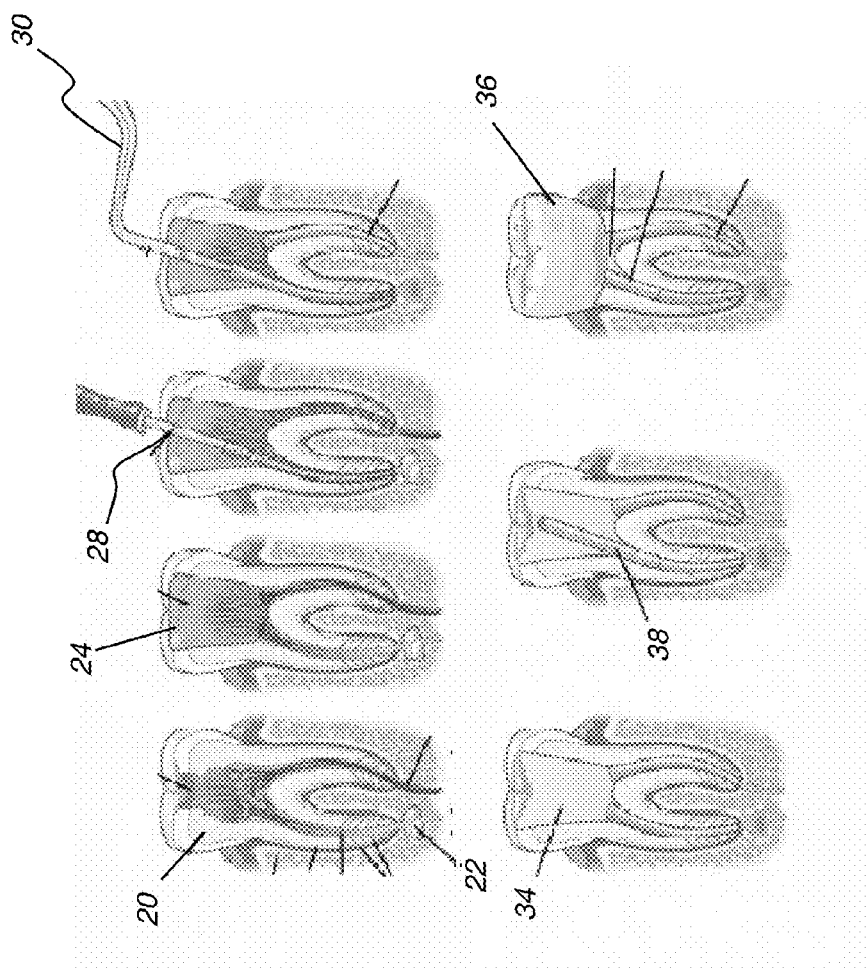
FIG. 1 is a sequence diagram that shows steps for root canal therapy.

DESCRIPTION OF EXEMPLARY
EMBODIMENTS

The following is a description of exemplary embodiments of the invention, reference being made to the drawings in which the same reference numerals identify the same elements of structure in each of the several figures. Where they are used, the terms "first", "second", and so on, do not necessarily denote any ordinal or priority relation, but may be used for more clearly distinguishing one element or time interval from another.

In the context of the present disclosure, the term "image" refers to multi-dimensional image data that is composed of discrete image elements. For 2-D images, the discrete image elements are picture elements, or pixels. For 3-D images, also termed volume images, the discrete image elements are volume image elements, or voxels. In the context of the present disclosure, the term "spline" is equivalent to a curve, free-form curve, or line.

In the context of the present disclosure, the term "index" refers to an alphanumeric character or string that is indicative of the relative likelihood of a particular detected condition. As a type of indicator, the index value is relative to some type of scale, such as an integer or real number between and including 0 through 5 or alphabetic characters from A through F. By way of example using a 0-5 scale, an index or index value of 0 can indicate that a particular condition is extremely unlikely and an index or index value of 5 would indicate that there is high probability for the particular condition.

Reference is made to U.S. Ser. No. 13/422,145 filed on Mar. 16, 2012, entitled "INTERACTIVE 3-D EXAMINATION OF ROOT FRACTURES", in the name of Souza et al., incorporated herein in its entirety.

As described by Falcao in the article entitled "The Image Foresting Transform: Theory, Algorithm, and Applications," in *IEEE Trans on Pattern Analysis and Machine Intelligence,* 26 (1): 19-29, 2004, fully incorporated herein by reference, a multi-dimensional image can alternately be expressed as a set of nodes and arc-weights. By taking advantage of this alternate type of data structure, a person skilled in the art can devise a processing algorithms in the control processing unit (CPU) or graphics processing unit (GPU) for processing substantial amounts of image data. In the context of the present disclosure, the term "IFT", also known as the image foresting transform, refers to a framework that represents the image data as a set of nodes and arcs-weights and is used to develop efficient image processing operators.

In the context of the present disclosure, terms such as "viewer", "user", "technician", "practitioner" and "operator" are considered to be equivalent terms for the person who uses the system and observes and manipulates the displayed view of the volume data for one or more of the patient's teeth. The operator can be a dental practitioner or technician or other person.

The term "highlighting" for a displayed feature has its conventional meaning as is understood to those skilled in the information and image display arts. In general, highlighting uses some form of localized display enhancement to attract the attention of the viewer. Highlighting a portion of an image, such as an individual organ, bone, or structure, or a path from one chamber to the next, for example, can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

Figure 2:
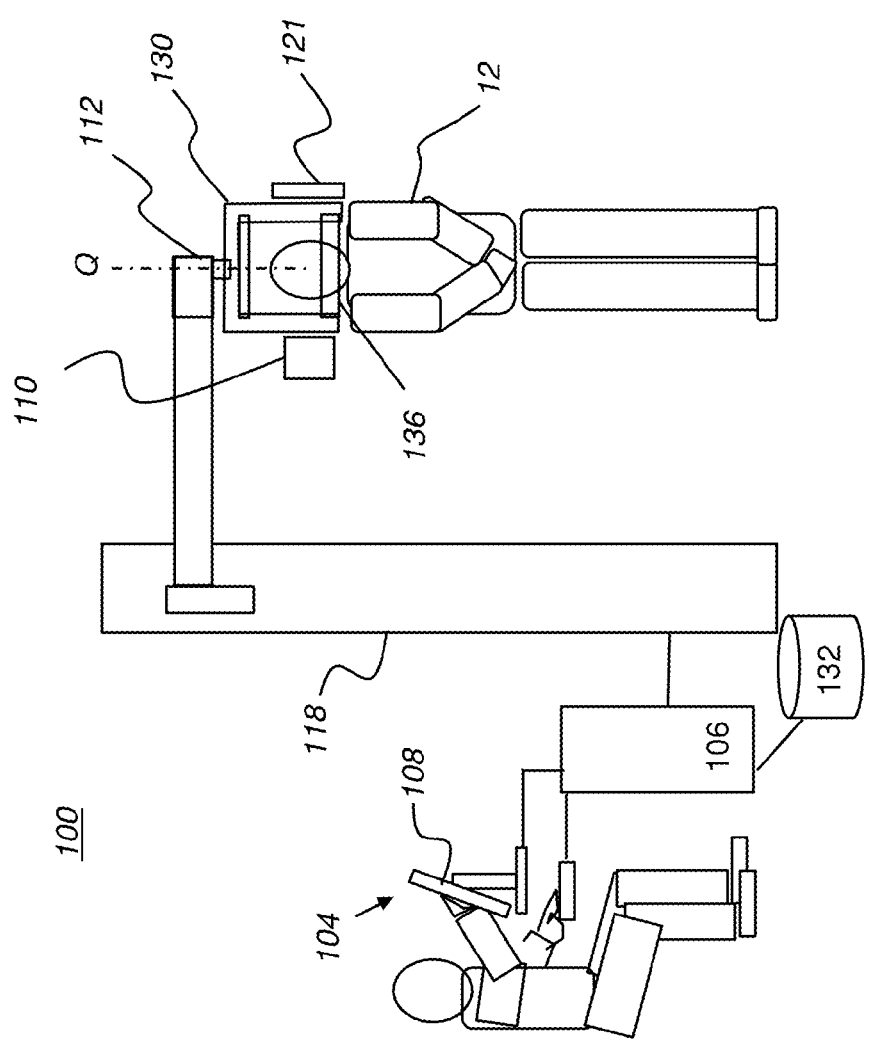
FIG. 2 is a schematic block diagram that shows components of a CBCT imaging apparatus for dental imaging.

FIG. 2 shows an imaging apparatus 100 for volume imaging, such as CBCT imaging, in which a succession of two or more 2-D images is obtained and images of adjacent content are processed to form a 3-D or volume image. A rotatable mount 130 is provided on a column 118 for imaging a patient 12. Mount 130 maintains an x-ray source 110 and a radiation sensor 121 on opposite sides of the head of patient 12 and rotates to orbit x-ray source 110 and sensor 121 in a scan pattern about the head. Mount 130 rotates about an axis Q that corresponds to a central portion of the patient's head, so that its attached components orbit about the head. Sensor 121, a digital radiography sensor according to an embodiment of the present invention, is coupled to mount 130, opposite x-ray source 110 that emits a radiation pattern suitable for CBCT volume imaging. An optional head support 136, such as a chin rest or bite element, provides stabilization of the patient's head during image acquisition. A computer 106 has an operator interface 104 and a display 108 for accepting operator instructions or commands and for display of volume images obtained by imaging apparatus 100. Computer 106 is in signal communication with sensor 121 for obtaining image data and provides signals for control of x-ray source 110 and, optionally, for control of a rotational actuator 112 for mount 130 components. Computer 106 can include memory 132 and/or can access data by communicating over a wired or wireless communications network, as is well known to those skilled in the art.

Images obtained from imaging apparatus 100 are processed to provide a volume image that allows a practitioner to view teeth and supporting structures in detail. The volume image data obtained from imaging apparatus 100 enables the practitioner to view images of a tooth that can allow assessment of endodontic conditions that can be difficult to detect using conventional radiography images.

For an identified tooth, an automated analysis can segment the interior of the tooth and provide an indicator for possible fracture or other type of lesion. The indicator, for example, can be in the form of an index of relative likelihood of a root fracture or other condition. In one arrangement, a virtual cutting plane is automatically generated and displayed for the tooth, enabling the operator to view a suspected fracture or other lesion more closely.

FIG. 3A shows a plan view of an image 72 obtained using volume imaging apparatus 100. Image 72 can be any slice of the image, as the image slice would appear on display 108 (FIG. 2). Image 72 is used as a type of reference image for markup. FIG. 3A shows, within image 72 the tooth of interest, a subject tooth 40, that the practitioner would like to view in detail. One or more neighboring or adjacent teeth 42 may also be shown. Background content 44 is in the area outside of teeth 40 and 42. A first operator instruction, a tooth identifier curve or spline 50, indicates the location of tooth content for subject tooth 40. A second operator instruction, a background or sculpting curve or spline 52 can be drawn on image 72 outside the border of the subject tooth or within any suitable background area.

In the example of FIG. 3A, background spline 52 indicates picture elements that lie in the background content 44, such as in the area outside of or between teeth 40 and 42. Tooth identifier spline 50 can span a single tooth in the displayed image 72, or can span multiple teeth, as described in more detail subsequently.

According to an embodiment, tooth identifier and background splines 50 and 52 respectively are entered using a touch screen, that is, where display 108 (FIG. 2) associated with the imaging apparatus 100 is a touch screen device. In an alternate embodiment, another type of pointer device is used, such as but not limited to a mouse, stylus, or joystick, for example. Splines of different colors are used to identify tooth content and differentiate the tooth content from background content for the segmentation algorithm. Tooth identifier and background splines 50 and 52 can be entered in any order; color is used to help differentiate tooth from background content. To enhance processing speed, the segmentation algorithm itself may optionally operate on a low-resolution copy of the volume image data.

Tooth identifier and background splines 50 and 52 provide sufficient information for IFT-based segmentation of subject tooth 40 from the balance of the volume image data, in real time. A wireframe 3-D model of subject tooth 40 is displayed side-by-side with 2-D segmented regions in the slice image, with tooth identifier spline 50 and background spline 52 highlighted as is shown in the example of FIGS. 3A and 3B. The subject tooth is highlighted on the display screen as verification to the operator. Examples of highlighting include change of color, size, heightened contrast, outlining, or other display enhancement feature.

Following the entry of one or more tooth identifier splines 50 or background splines 52 onto displayed image 72, the operator may enter a keyboard command or other instruction that initiates a segmentation algorithm that extracts the tooth volume from within the volume image data according to the entered splines. Segmentation algorithms that extract image content according to spline and other operator markup are well known to those skilled in the imaging arts and include those that utilize the Image Foresting Transform (IFT) described in the Falcao et al. article cited previously, for example. As shown in FIG. 3B, at the completion of 3-D segmentation processing, subject tooth 40 displays on display 108. FIG. 3B shows a wireframe view; an operator instruction, such as a keyboard command, toggles between surface rendering and wireframe rendering. The FIG. 3A view of the 2-D image slices of tooth 40 is provided at an initial view angle. This initial view angle may be one of the conventional sagittal, coronal, and axial view angles that are typically used as default view angles for CBCT data or may be a different view angle. In one arrangement, according to an embodiment of the present invention, a 3-D cutting plane is generated automatically in response to the operator instruction and an optimization routine finds a suitable viewing angle that maximizes the number of root canal and fracture-like pixels in the slice images. This is an initial cutting plane for viewing and paging through slices in the volume image, where both the root canal and the root fracture (if present) or other type of lesion are highlighted. A 3-D interactive examination phase is then initiated, as shown subsequently, allowing the operator to change the cutting plane's normal vector for any given oblique orientation. The operator is in control of image manipulation. This allows the operator to quickly and confidently examine abnormalities or lesions, such as fractures in 3D, with less likelihood of missing the selected tooth. According to an alternate arrangement, control keys are provided to switch quickly between standard view angles. Zoom in/out utilities are also available, using a mouse or other data entry technique or device.

Figure 3C:
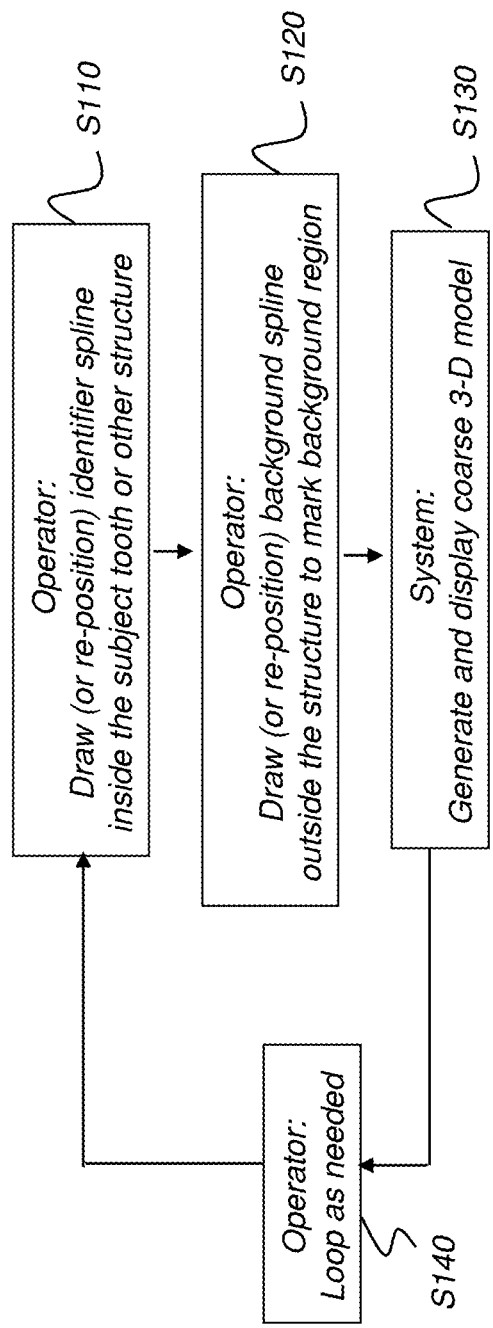
FIG. 3C is a logic flow diagram that shows operator interaction with the imaging system for obtaining a 3-D segmentation for a subject tooth.

FIG. 3C is a logic flow diagram that shows operator interaction with the imaging system for modeling and obtaining a 3-D segmentation for a subject tooth. In an object identification step S110, the operator positions or re-positions one or more identifier splines over the subject tooth or portion of a tooth or other structure to be modeled. In a background identification step S120, the operator positions or re-positions one or more background or sculpting splines for marking the background region. In response to operator entries in steps S110 and S120, the system generates and displays a coarse 3-D model in a model display step S130. In a looping step S140, the operator has the option to loop back through steps S110 and S120 as needed to refine and improve the results from the system that display in step S130. It must be noted that steps S110 and S120 can be performed in any order and can be repeated as many times as needed, with entry of as many identifying and background splines as are useful for providing a suitable 3-D modeling of the subject tooth or other structure. According to an embodiment of the present invention, the color of a spline indicates its function, either as an indicator or background spline 52. Additionally, the color of an entered indicator spline determines color that is used for the generated 3-D model that displays. On-screen utilities and tools provided with the mouse or other pointer enable changing the color of an entered spline as desired.

The operator can add additional tooth identifier and background splines 50 and 52 in order to refine the segmentation provided for subject tooth 40. This feature can help, for example, where the displayed segmentation appears to be inaccurate, such as where other teeth or tissue display with the segmented subject tooth 40.

Figure 4A:
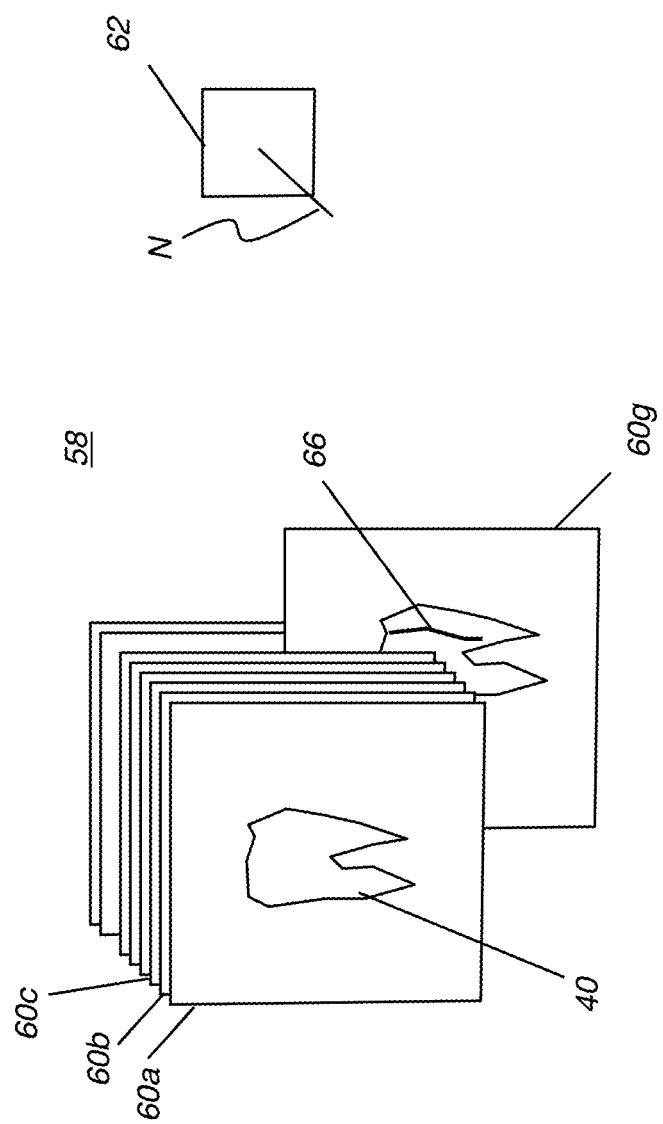

FIGS. 4A and 4B show, in schematic form, how different views of the volume data for tooth 40 can be presented and show how a cutting plane 62 can be defined and changed according to embodiments of the present invention. In FIG. 4A, a volume image 58 has its slices 60a, 60b, 60c, ... 60g, and other slices taken along cutting plane 62 having a normal N as shown. FIG. 4B shows how the same volume image data can be rearranged along a different cutting plane 62' having a corresponding normal N', so that the image content of volume image 58 is formed by slices 61a, 61b, 61c, and so on.

With the volume image provided in this form, the same subject tooth 40 can be viewed from alternate angles. Moreover, by paging through slices 60a, 60b, 60c, and so on, the viewer can display a slice that most effectively shows a problem or other point of interest in subject tooth 40. As is shown in FIG. 4A, a fissure 66 is most readily visible on slice 60g, obtained at the viewing angle defined by cutting plane 62. Other views of tooth 40 may not show fissure 66 or other anomaly in sufficient detail for assessment of the patient's condition.

FIGS. 4A and 4B represent different views of the same volume data, volume image 58. The arrangement of voxel data into slices of the appropriate geometry is performed using volume image reconstruction techniques familiar to those skilled in the image processing arts. Paging through successive slices of the volume image can be performed in any of a number of ways, such as by pressing a keyboard key or combination of keys, using a mouse or pointer, or using another appropriate user interface utility.

Figure 5B:
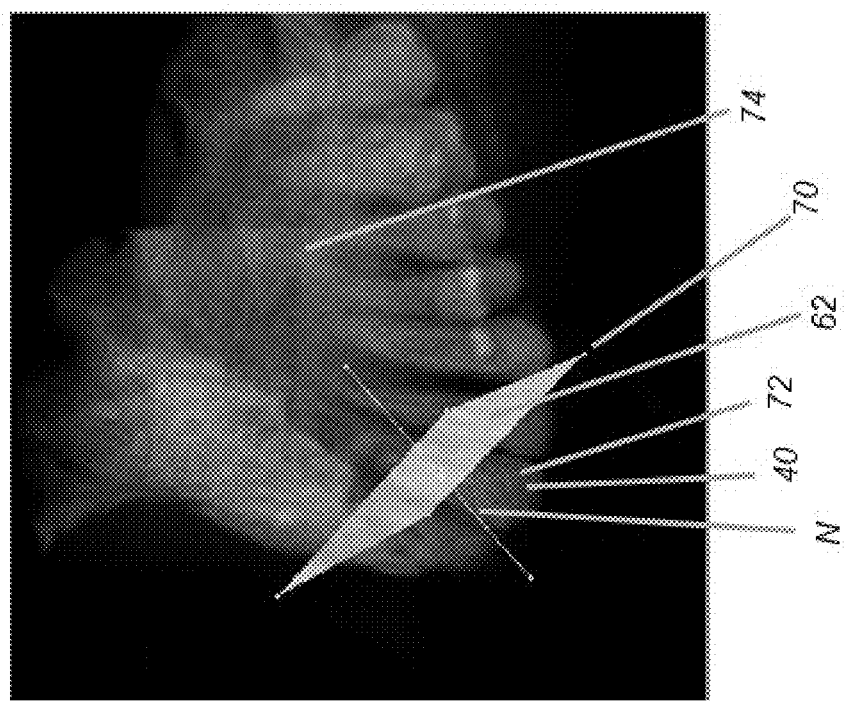
FIGS. 5A and 5B show results and tools for an interactive utility that provides 3D visualization of abnormalities of the root structure and surrounding bone structure.
Figure 5A:

The view of FIG. 5A shows a slice 60 obtained and displayed from an image of a subject tooth 40, where slice 60 shows a root fracture 68, such as a VRF described earlier, or other endodontic complication. It can be appreciated that the problem with the tooth that is indicated in FIG. 5A cannot be as readily perceived in a view taken from another angle.

FIG. 5A is a default view calculated by an algorithm that detects root canal and tooth fracture features in the image data. This can be any of a number of types of conventional algorithm that detect fractures and other features according to pixel intensity, gradient, feature shape, and other characteristics. This view can automatically display when a particular tooth 40 is selected. This view is typically not a conventional axial, sagittal, or coronal view of the tooth; instead, the view angle is selected by the system for good visibility of root canal and fracture features.

Figure 6C:
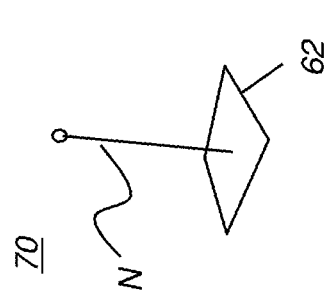
FIGS. 6A, 6B, and 6C show a view angle icon rotated to show entry of an instruction to view the data at three alternate viewing angles.
Figure 6B:
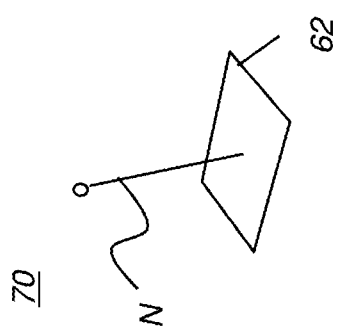
Figure 6A:
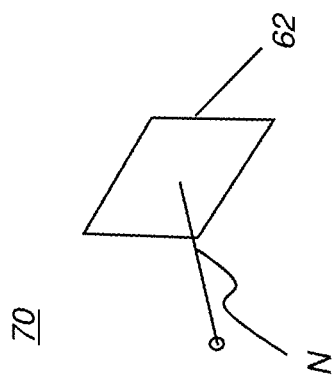

FIG. 5B also shows a volume rendering 74, as described in an article by Souza et al., entitled "Volume rendering in the presence of partial volume effects," *IEEE Trans on Medical Imaging*, 24(2): 223-225, 2005), incorporated herein by reference in its entirety. The subject tooth 40 is highlighted using a wireframe surface rendering in image 72. A 3D user interaction utility for specifying the particular cutting plane 62 is shown, as used for arranging the volume image data. An angle selection icon 70 shows a cutting plane 62 and normal N in representational form, for manipulation by the operator. Using a mouse, touch screen, or other pointing mechanism, the operator can change the orientation of normal N and plane 62 of icon 70, thereby providing a plane angle instruction for modifying the angle at which the volume image data is presented. By way of example, FIGS. 6A, 6B, and 6C show icon 70 rotated to show three alternate viewing angles.

Figure 7A:
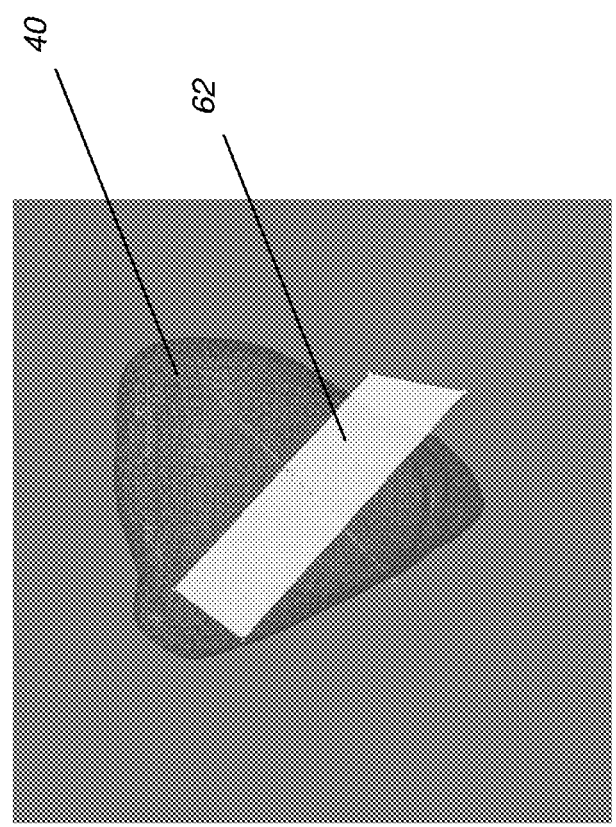
FIG. 7A shows a cutting plane position relative to a segmented tooth.
Figure 7C:
FIG. 7C shows an alternate slice from the segmented tooth according to the cutting plane setting shown in FIG. 7A.
Figure 7B:
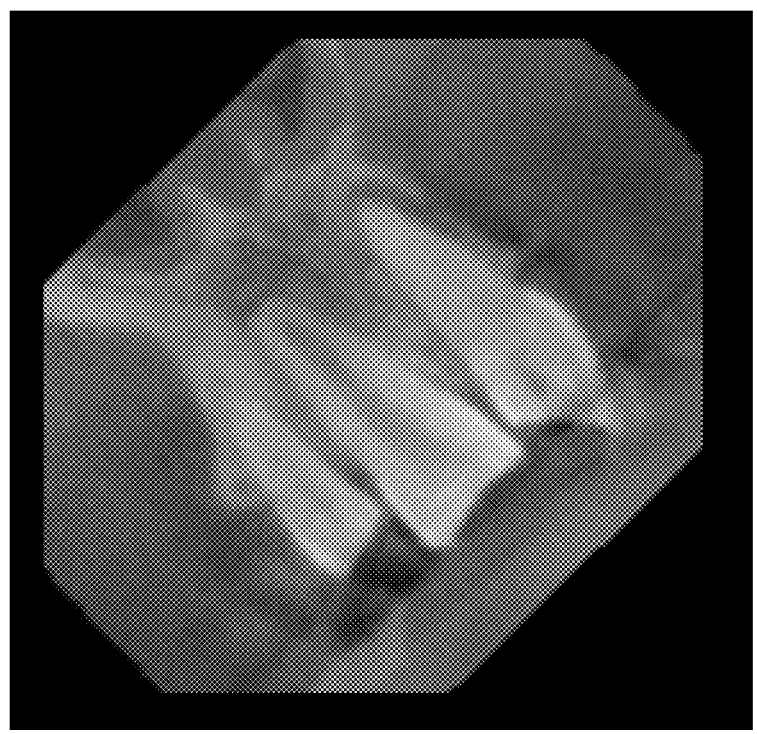
FIG. 7B shows a slice from the segmented tooth according to the cutting plane setting shown in FIG. 7A.
Figure 8B:
FIG. 8B shows a slice from the segmented tooth according to the cutting plane setting shown in FIG. 8A.
Figure 8A:
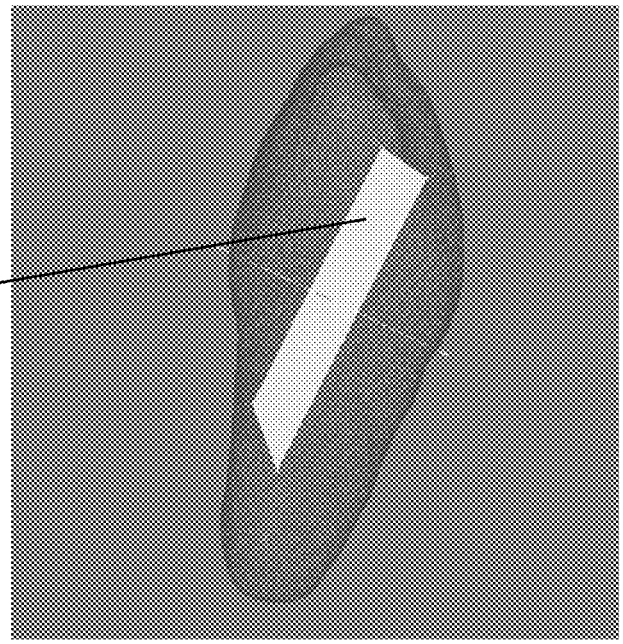
FIG. 8A shows a cutting plane position relative to a segmented tooth.

By way of example, FIG. 7A shows cutting plane 62 at a given angle with respect to the display of a segmented tooth 40. FIGS. 7B and 7C show two of the many image slices 74 and 76, respectively, that are available at the view angle of this cutting plane. According to an embodiment of the present invention, the wheel on the operator mouse is moved/turned to page through views of successive slices in a sequential manner. Other types of paging utility can alternately be used. FIGS. 8A and 8B show the use of an alternate cutting plane 62 for viewing image slices 78 from the same tooth at a different viewing angle.

Operator interface utilities for changing the view angle, paging through slices according to the view angle, marking an image to indicate the tooth and background content for segmentation, and other functions can use keyboard commands, on-screen menu instructions provided on a display, instructions selected from a menu, such as from a pull-down menu, instructions entered by selecting control buttons on the display screen, or instructions entered from some other data entry technique or device.

Figure 9A:
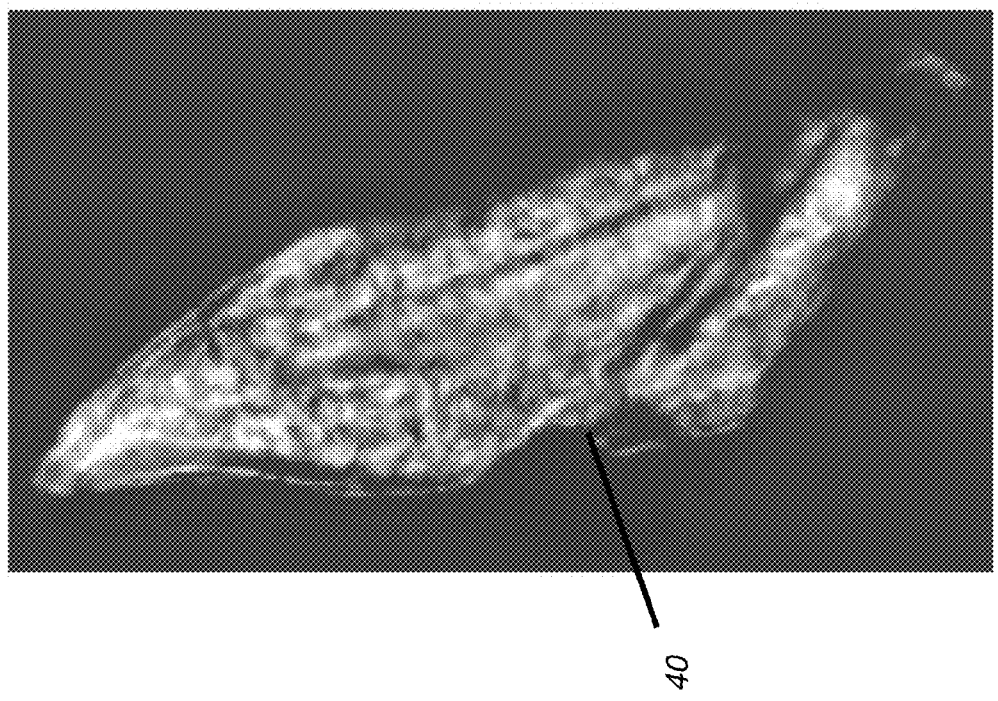
FIGS. 9A, 9B, and 9C show different volume rendering views of a subject tooth that exhibits VRF.
Figure 9B:
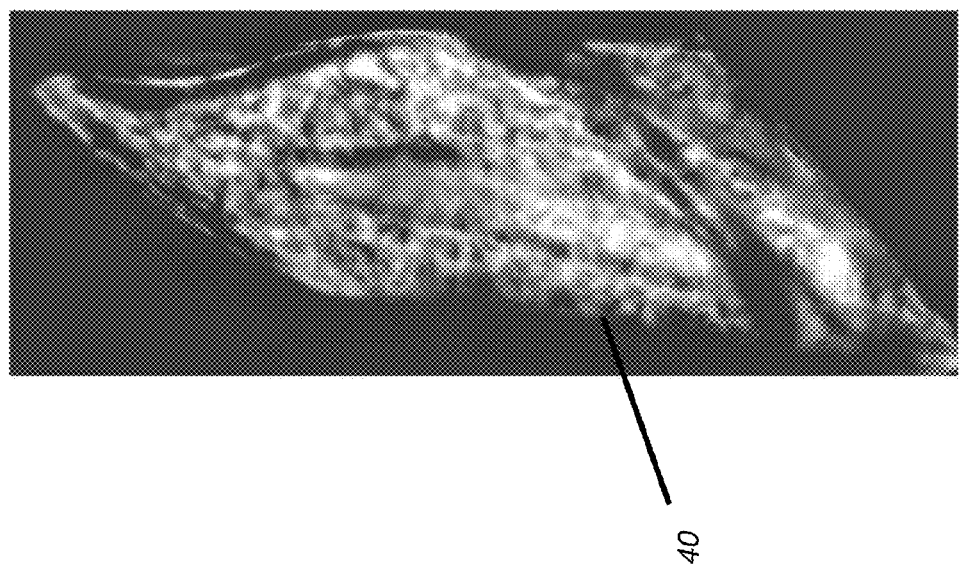
Figure 9C:
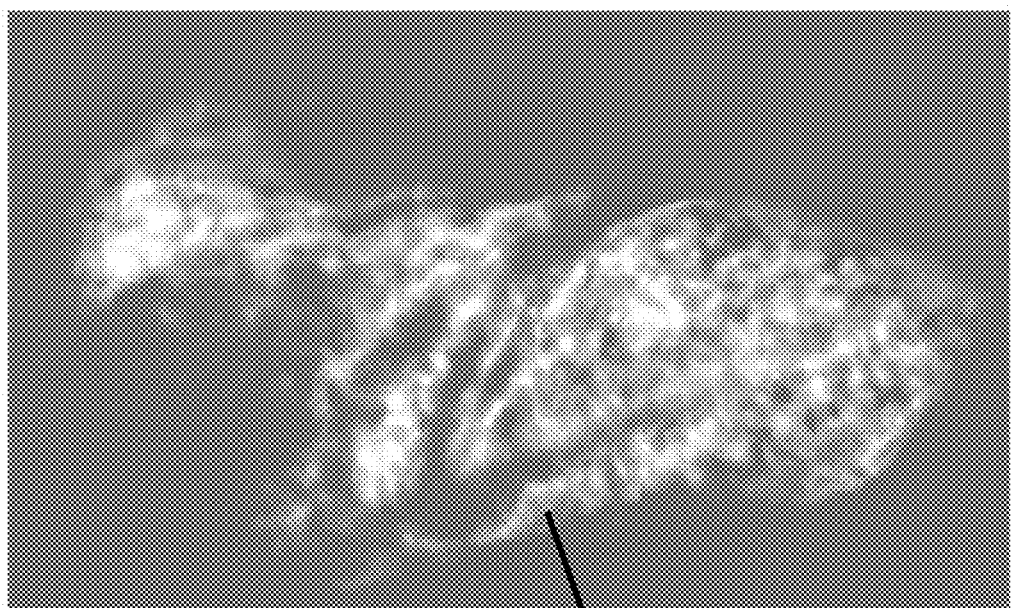

FIGS. 9A, 9B, and 9C show different volume rendering views of a subject tooth 40 that exhibits VRF.

Embodiments of the present invention allow an operator to flexibly switch from one tooth to the next using the spline marking method described earlier with reference to FIG. 3A. The operator can move to a different tooth by changing the position of tooth identifier spline 50, either by deleting and redrawing spline 50, or moving this spline onto another tooth.

Figure 10B:
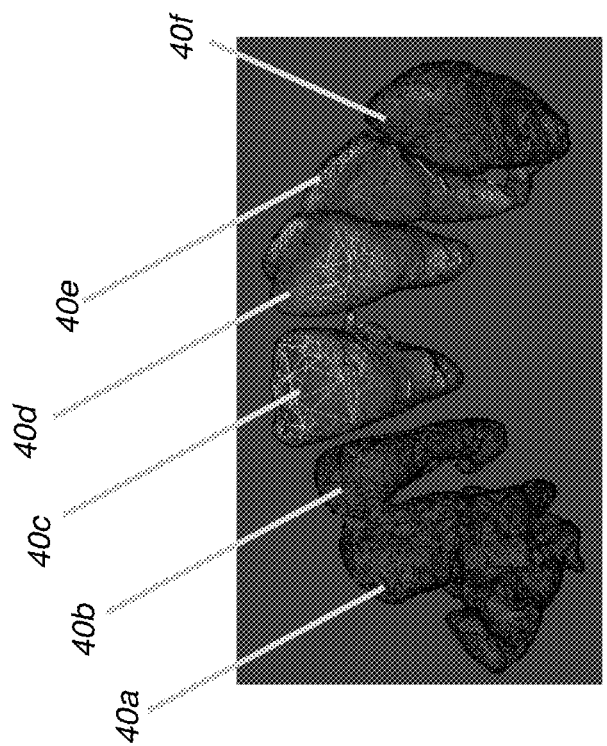
FIG. 10B shows segmented teeth displayed for the multiple spline example of FIG. 10A.
Figure 10A:
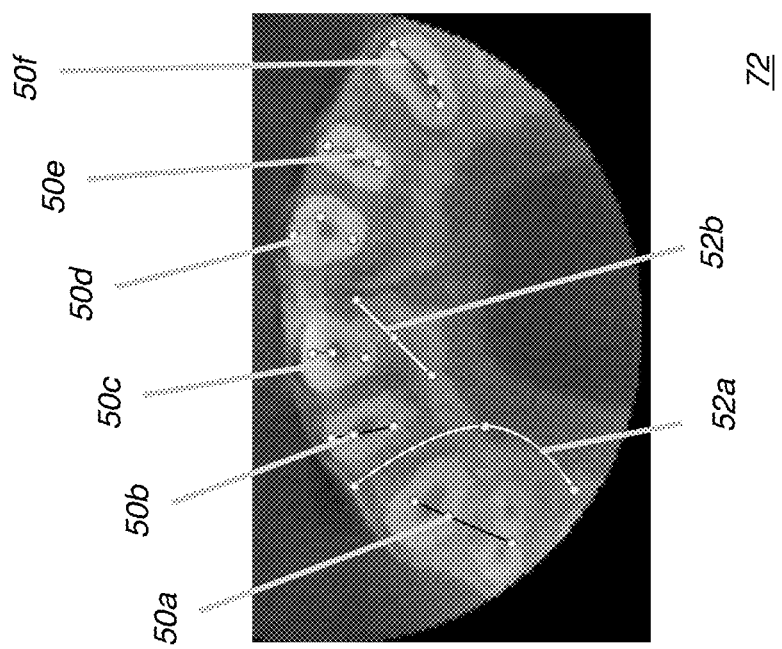
FIG. 10A shows a reference image having splines that indicate multiple teeth for segmentation.

An embodiment allows the operator to specify more than one subject tooth at a time for segmentation. Referring to FIG. 10A, there is shown image 72 having multiple sculpting splines 52a and 52b for indicating background content. The use of multiple sculpting splines can help to provide more information on background content to the segmentation algorithm. Tooth identifier splines 50a, 50b, 50c, 50d, 50e, and 50f then indicate individual subject teeth or clusters of adjacent teeth for segmentation. FIG. 10B shows a resulting segmentation, with multiple corresponding subject teeth 40a, 40b, 40c, 40d, 40e, and 40f extracted from the volume image content and displayed. Different colors can be used to distinguish the individual teeth displayed, with the colors corresponding to colors of operator-entered tooth identifier splines 50a, 50b, and so on. As with the single tooth display, a cutting plane 62 (FIG. 5B) can also be used for adjusting the view angle for slices of the segmented structures.

Figure 11:
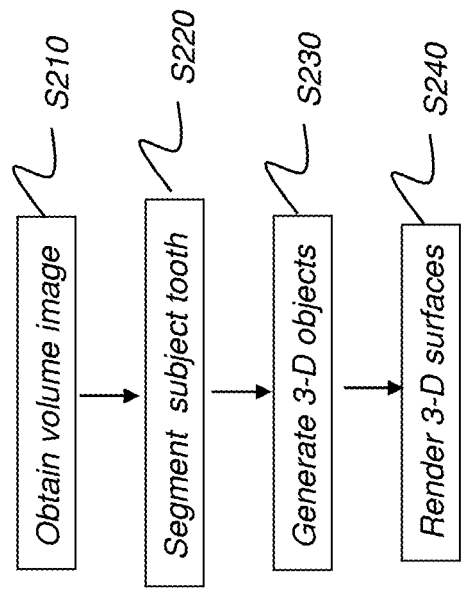
FIG. 11 is a logic flow diagram that shows a sequence of steps used for surface rendering of a volume image.

Embodiments can be adapted to provide different 3-D visualization combinations of both volume rendering and surface rendering for a subject tooth, its internal structures, and its surrounding bone anatomy. The logic flow diagram of FIG. 11 shows a sequence of steps used for surface rendering of the volume image data. In an obtain volume step S210, a CBCT or other volume image containing the subject tooth is obtained. A segmentation step S220 follows, segmenting the subject tooth from the balance of the volume image data. A 3-D object generation step S230 then identifies features of interest from the volume image. A rendering step S240 then generates a 3-D surface rendering of the subject tooth and its related features of interest.

Figure 12C:
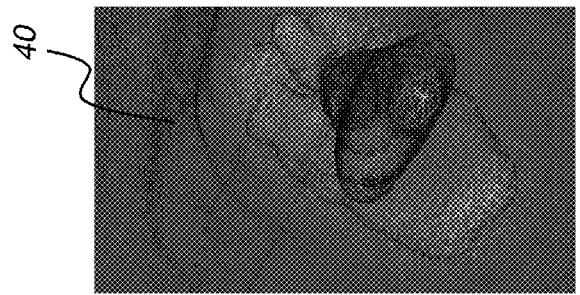
FIGS. 12A, 12B, and 12C are images that show results of surface rendering for a subject tooth having a root canal and a fracture.
Figure 12B:
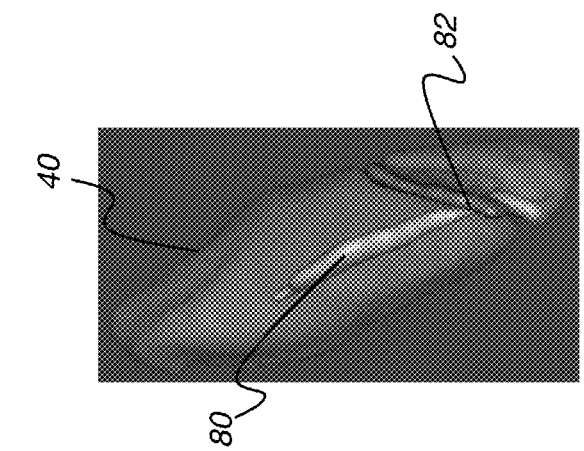
Figure 12A:
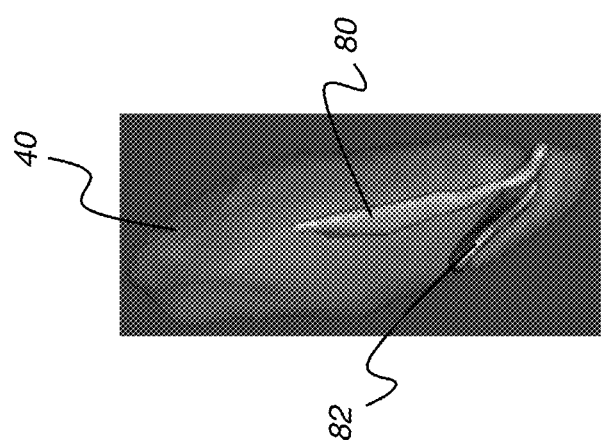

FIGS. 12A, 12B, and 12C show results of surface rendering for subject tooth 40 having a root canal 80 and a fracture 82. FIG. 12C is a wire frame view of tooth 40 from another view angle.

Figure 13:
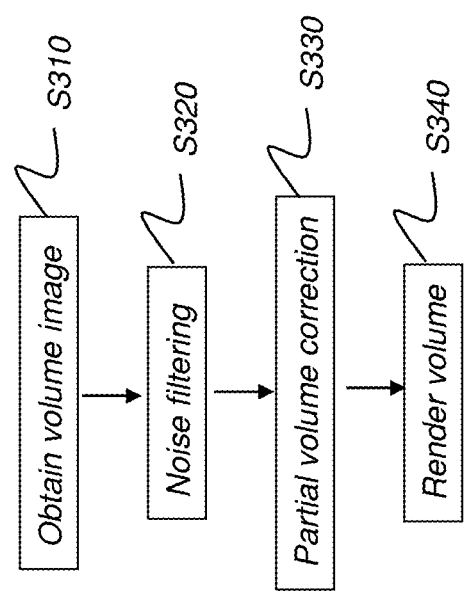
FIG. 13 is a logic flow diagram that shows a sequence of steps used for volume rendering according to an embodiment of the present invention.

FIG. 13 is a logic flow diagram that shows a sequence of steps used for volume rendering according to an embodiment of the present invention. In an obtain volume step S310, a CBCT or other volume image containing the subject tooth is obtained. An optional noise filtering step S320 provides noise filtering for the volume image data. An optional partial volume correction step S330 then corrects for partial volume effects. These imaging artifacts occur at tissue interfaces and can cause inaccuracy in both volume and surface rendering. One approach to partial volume correction is described, for example, in an article entitled "Volume Rendering in the Presence of Partial Volume Effects" by Andre Souza, Jayaram Udupa, and Punam Saha in *IEEE Transactions on Medical Imaging*, Vol. 24, No. 2, February 2005, pp. 223-235, incorporated herein by reference in its entirety. A volume rendering step S340 is then executed, providing a rendered image of the subject tooth, such as the images shown in FIGS. 9A, 9B, and 9C, for example.

A number of different types of structure identification and image segmentation algorithms could be employed for providing tooth and background identification and for providing segmentation according to entered operator instructions. According to an embodiment of the present invention, an image foresting transform (IFT) is used, as described, for example, in the Falcao et al. article noted earlier. Other types of image representation could alternately be used to represent the image and allow its manipulation.

A number of segmentation techniques can be used for segmenting one or more suspect teeth from volume image data of the patient's mouth. The use of operator-entered splines or other markings is one among a number of methods known to those skilled in the dental imaging arts. Other well-known types of suitable segmentation techniques that can use operator markup include various clustering algorithms, seeded region-growing procedures, and fast marching methods, for example.

Figure 14A:
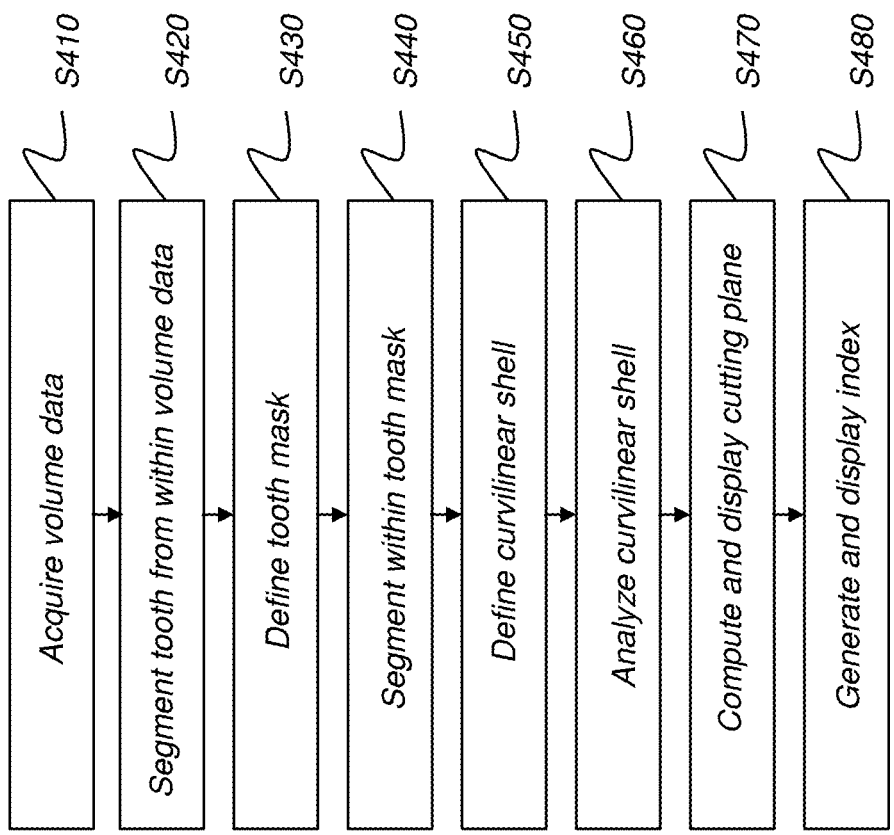
FIG. 14A is a logic flow diagram showing a sequence for analyzing a subject tooth and reporting a suspected fracture or other lesion.

Once a subject tooth is segmented, image analysis, highlighting of suspected/candidate features, and results reporting for the subject tooth can be performed. The logic flow diagram of FIG. 14A shows a sequence for analyzing a subject tooth and reporting a suspected fracture or other lesion. In a data acquisition step S410, volume image data for a portion of the dental arch containing the subject tooth or teeth is obtained. This can be a CBCT or other volume image, for example. Noise filtering and partial volume correction can also be provided, as described previously. A tooth segmentation step S420 then segments each subject tooth from other teeth and mouth features. For each subject tooth, a tooth mask definition step S430 executes, defining a 3-D tooth mask that outlines the boundary of the subject tooth in each dimension. The 3-D tooth mask substantially defines the spatial position and volume of the tooth. Definition of a tooth mask for 3-D volume content applies conventional rules for mask generation from given image content, familiar to those skilled in image processing and extended to three dimensions. A second segmentation step S440 then segments portions of the subject tooth within the tooth mask to separate bone and restorative materials from pulp and other soft structures that are internal to the tooth.

The soft materials in the tooth canal and connected pulp are detected and excluded from analysis in step S440, as described in more detail subsequently, because of their relatively low density to radiation. These materials tend to appear as dark areas in the imaged volume and could otherwise cause false positives, appearing to be tooth fractures. Within the tooth mask region, a curvilinear shell is defined in a shell definition step S450. The curvilinear shell defines a shell of interest that includes that portion of the tooth volume that is searched for suspected tooth fractures or other lesions in a shell analysis step S460. Features within at least a portion of the shell of interest are analyzed in step S460 for tooth fracture characteristics and any suspicious features are identified. A cutting plane identification step S470 then computes a cutting plane that best shows the results of fracture detection for a suspect feature. A display index generation step S480 then computes and displays a recommended attention index that is indicative of a suspected fracture or other lesion or lesions identified for the segmented subject tooth and alerts the practitioner to the suspected lesion. The index value may indicate the likely severity of the lesion. The recommended attention index displays to the practitioner on display 108 (FIG. 2), for example.

The curvilinear shell that is defined in shell definition step S450 includes that portion of the tooth that is analyzed for tooth fractures or other lesions. FIG. 14B shows schematically how a curvilinear shell 138 is generated. 138. The curvilinear shell begins at a position set back from the boundary of the tooth mask 166, such as by a distance D1 of about 15% of the width of the tooth mask, for example. The shell is that portion that lies between distance D1 and a distance D2 that is at about 50% of the width of the tooth mask. For image voxels in a detected fissure within the curvilinear shell, parameters that are examined include brightness, brightness depth, fissure depth, maximum width, and distance to the boundary of the tooth mask. Fissures and similar features that lie within the shell but closer to one or more edges or boundaries of the tooth mask are assigned a proportionately higher weight. Values for fracture detection can be generated and refined based on a training dataset. The summed weights for a tooth are used in an exponential model for computing and assigning the displayed index that is generated. In one arrangement, the display index that is generated has a value between 0 and 1 that indicates the relative likelihood and apparent severity of a tooth fracture or other lesion, wherein 0 indicates low probability and 1 indicates very high probability of root fracture or other problem.

The index score calculation for a suspected fracture, other type of lesion, or other feature can be performed using any of a number of techniques known to those skilled in the image analysis arts, including the use of trained logic or neural network algorithms, for example. Alternately, relative dimensional characteristics of a suspected fracture, such as length and width of a possible fissure, or number of voxels along a line of the fracture can be used to generate an index value.

Multiple indices can be generated for a single tooth. According to at least one embodiment, multiple indices indicating recommended required attention display for a tooth where multiple fractures or other lesions are detected in the same tooth by the image processing software. Selecting a particular index from the displayed listing of multiple indices can cause the corresponding fracture or other lesion to be highlighted.

Figure 15:
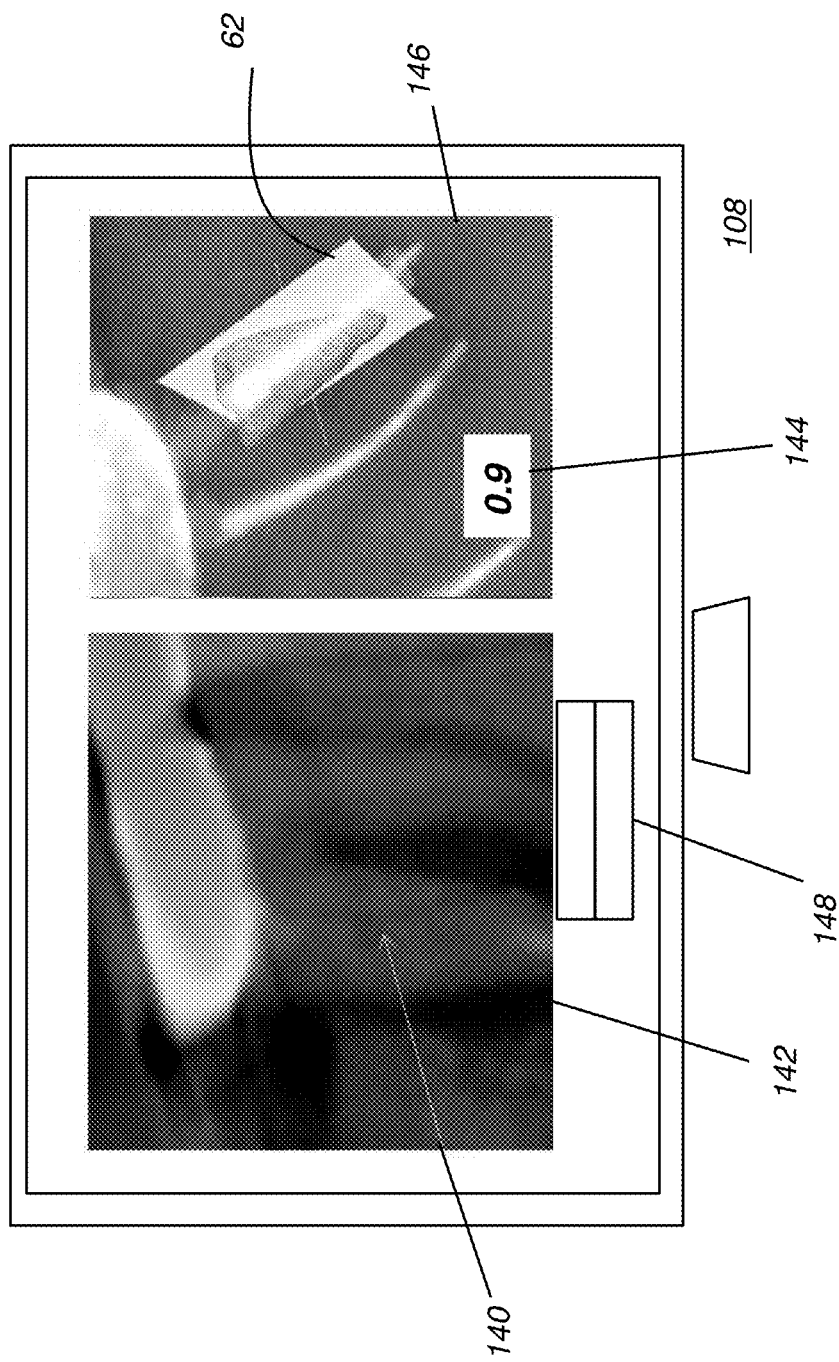
FIG. 15 shows a display with a line fracture and an image having a cutting plane and recommended attention index.

FIG. 15 shows the appearance of an apparent line fracture 140 appearing on an image slice 142 on display 108. Following the processing steps described previously, display 108 then shows an image 146 having a displayed recommended attention index 144 and cutting plane 62. Cutting plane 62 initially shows a plane of the segmented tooth that has a high number of voxels along the line of the fracture. The practitioner can then manipulate the cutting plane 62 angle for different views, including 2-D views for image slices at different depths and at alternate angles, as described previously. A listing 148 of other teeth having suspected fractures is also provided for operator selection. Listing 148 can be in order, such as arranged by corresponding index values or by number of lesions or fractures, for example. Index 144 can display in any of a number of ways, and may be highlighted in color, for example. Multiple indices 144 can display for a single tooth. Indices can be highlighted as well as highlighting one or more portions of the tooth that correspond to individual indices.

Figure 16:
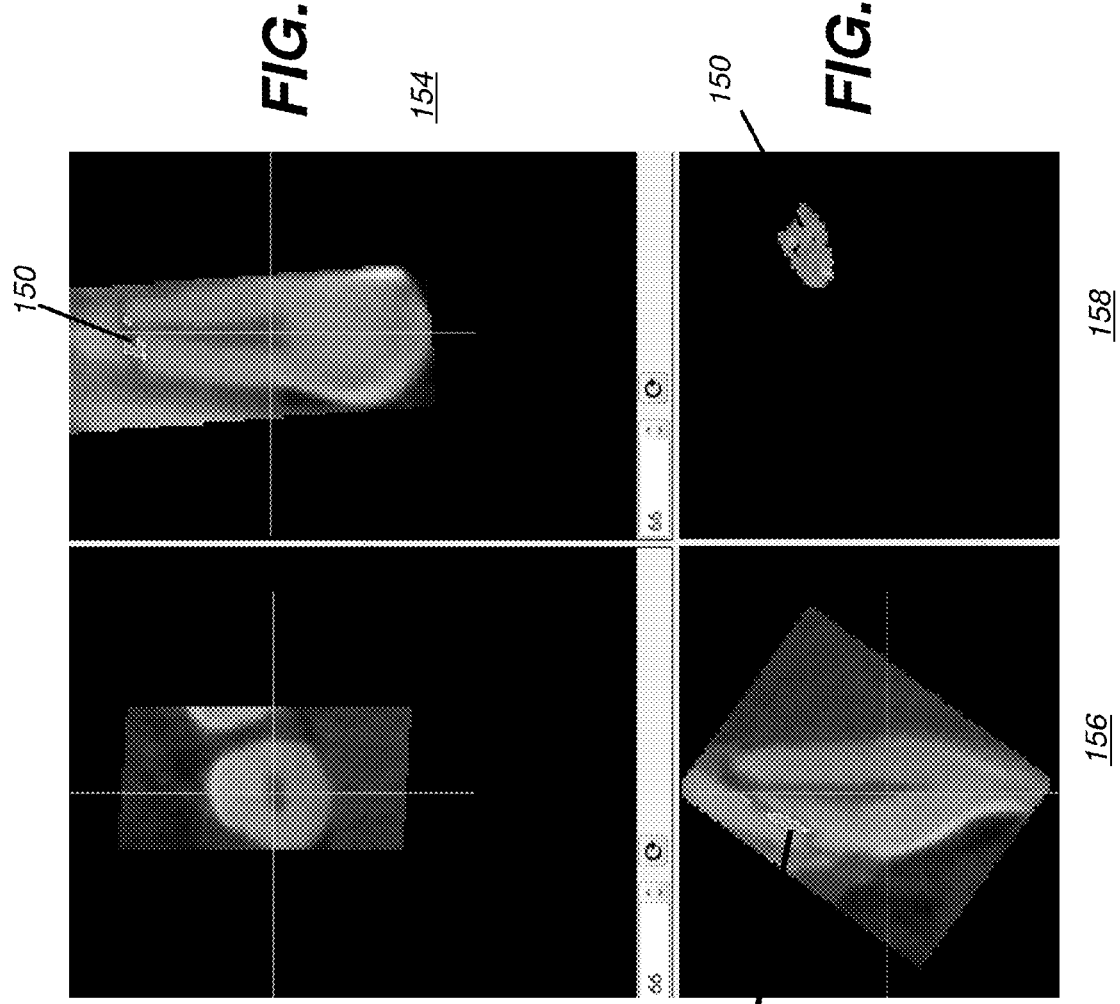
FIG. 16A is an axial view image for a suspect tooth.
FIG. 16B is a coronal view image for a suspect tooth, showing location of a fracture.
FIG. 16C is a sagittal view image for a suspect tooth, showing location of a fracture.
FIG. 16D is a 3-D view image of the fracture only, segmented from the other views.

FIG. 16A shows an axial view image 152 for the suspect tooth. FIG. 16B shows a coronal view image 154 for the suspect tooth and shows the relative position of a detected fracture 150. FIG. 16C shows a sagittal view image 156 with fracture 150. FIG. 16D is a 3-D view image 158 of only the fracture 150, segmented from the other views.

Figure 17:
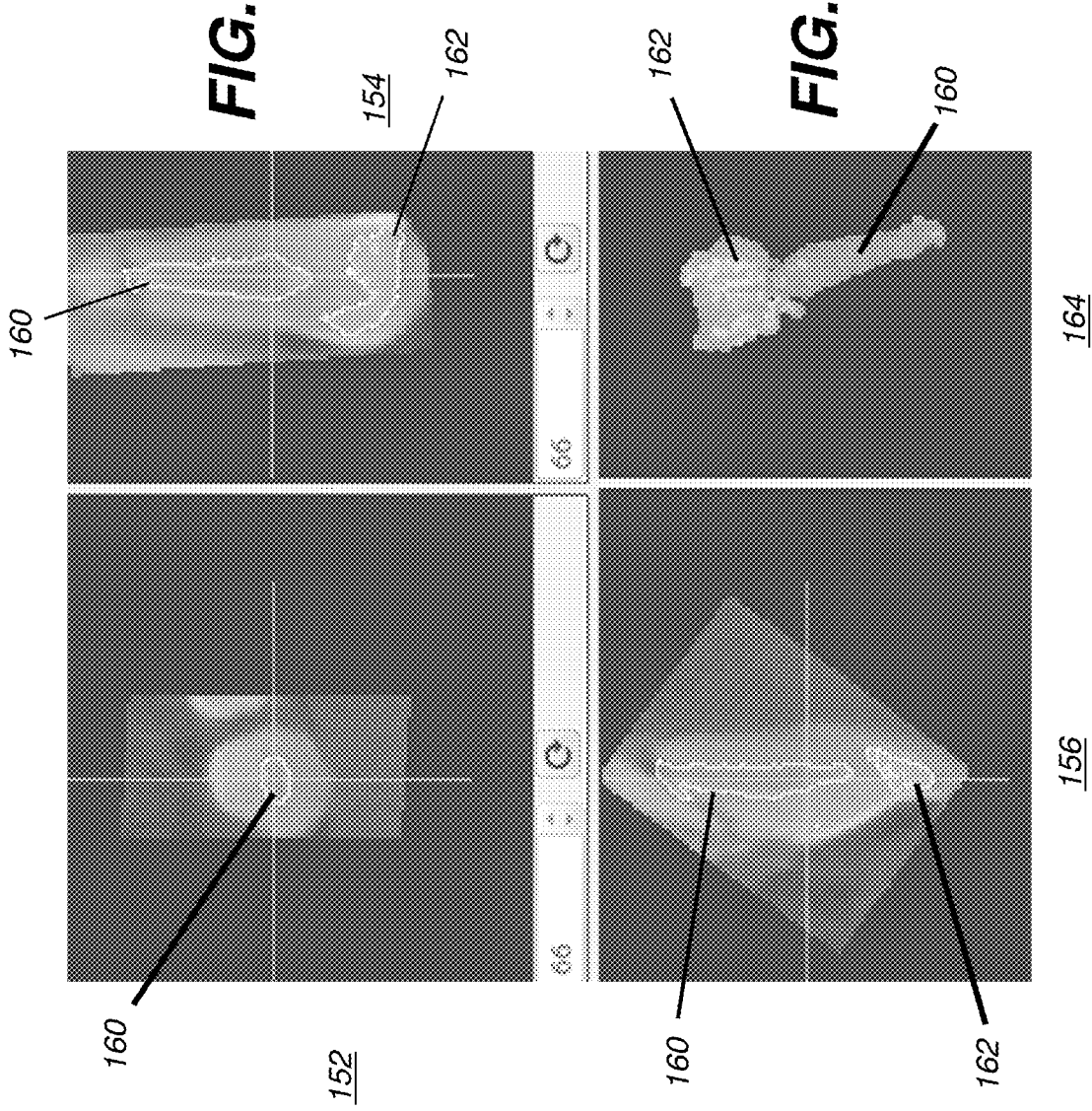
FIG. 17A is an axial view image for a suspect tooth, showing root canal material outlined.
FIG. 17B is a coronal view image for a suspect tooth, showing root canal material and pulp outlined.
FIG. 17C is a sagittal view image for a suspect tooth, showing root canal material and pulp outlined.
FIG. 17D is a 3-D view image showing only root canal and pulp features segmented from the tooth.

As noted in the procedure of FIG. 14A, segmentation step S440 segments soft tissue features of the suspect tooth for improved detection of tooth fractures. FIG. 17A shows the axial view image 152 with root canal material 160 outlined. FIG. 17B shows the coronal view image 154 with root canal material 160 and pulp 162 outlined. FIG. 17C shows the sagittal view image 156 with root canal material 160 and pulp 162 outlined. FIG. 17D is an image 164 showing only root canal material 160 and pulp 162. According to an embodiment of the present invention, the operator can switch between views of various segmented portions of the tooth volume in order to observe different soft materials as shown in FIGS. 16A-17D. This display capability helps the practitioner to review and verify results of automated processing for an improved assessment of the fracture or other lesion.

Unlike previously disclosed methods for detecting and reporting tooth fractures, embodiments of the present invention automatically detect a suspected fracture and alert the viewer by providing an index or other type of score that is indicative of the likelihood of a fracture or other lesion. This allows the operator to examine a suspected tooth in detail, viewing the tooth from multiple angles using the variable cutting plane and viewing features described herein.

Figure 18:
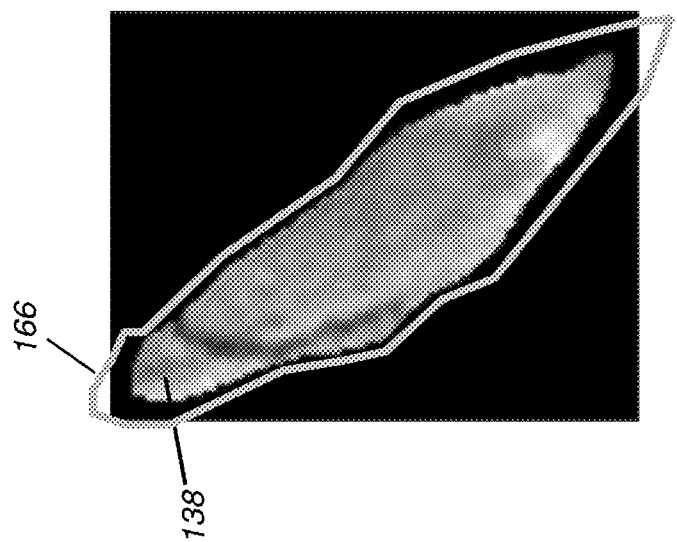
FIG. 18 shows a 2-D image of an extracted curvilinear shell.

FIG. 18 shows a 2-D image of an extracted curvilinear shell 138, the shell of interest, within a tooth mask 166. An embodiment of the present invention provides Topological Curvilinear Splatting (CURV Visualization) based on the previous extracted curvilinear shell. Splatting techniques for volume rendering are familiar to those in the volume imaging arts and can be particularly useful for handing a curvilinear volume, particularly where rendering speed is of value. This method basically flattens the 3-D mesh of a shell surface into a 2-D image at the user specified depth (e.g., 0.6 mm). The goal of this method is improved display of the fracture extension along the tooth surface.

This disclosure includes a description of a system and method, with parts being executable using a computer program product, such as computer 106 shown in FIG. 2 or other control logic processor device that is programmed with instructions for displaying an image, accepting operator instructions and input data, and responding to the operator entries. Accordingly, an embodiment may be in the form of a hardware embodiment or an embodiment combining software and hardware aspects that may all generally be referred to herein as a "circuit" or "system." Furthermore, parts may take the form of a computer program product embodied in a computer-readable storage medium, with instructions executed by one or more computers or host processors. This medium may comprise, for example: magnetic storage media such as a magnetic disk (such as a hard drive or storage disk) or magnetic tape; optical storage media such as an optical disc, optical tape, or machine readable bar code; solid state electronic storage devices such as solid state hard drives, random access memory (RAM), or read only memory (ROM); or any other physical device or medium employed to store a computer program. The computer program for performing the method may also be stored on computer readable storage medium that is connected to a host processor by way of the internet or other communication medium.

At least one embodiment of the system allows a user/operator to select a specific tooth or group of teeth from volume image data and to modify the angle at which the tooth is viewed. The operator is able to review slices of the tooth from angles other than the standard coronal, sagittal, or axial images provided in conventional volume image presentation. Interactive operation allows the operator to progressively improve tooth segmentation used to isolate the data for a particular tooth from other volume image data.

It should be noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

Those skilled in the art will recognize that the equivalent of such a computer program product may also be constructed in hardware. The computer-usable or computer-readable medium could even be paper or another suitable medium upon which executable instructions are printed, as the instructions can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport computer instructions for use by, or in connection with, an instruction execution system, apparatus, or device.

While the system and method have been illustrated with respect to one or more implementations, alterations and/or modifications can be made to the illustrated examples without departing from the spirit and scope of the appended claims. In addition, while a particular feature may have been disclosed with respect to only one of several implementations, such feature can be combined with one or more other features of the other implementations as can be desired and advantageous for any given or particular function.

The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal.

Other embodiments will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for analyzing a subject tooth, executed at least in part by a computer, comprising:
    obtaining volume image data including at least the subject tooth;
    segmenting the subject tooth from within the volume data according to one or more operator instructions;
    generating an index indicative of a suspected fracture that is automatically identified for the segmented subject tooth, where the index is indicative of relative likelihood that the suspected fracture exists for the segmented subject tooth;
    displaying the subject tooth with the suspected fracture highlighted; and
    displaying, storing, or transmitting the generated index, where generating the index further comprises:
    defining a 3D tooth mask for the segmented subject tooth, wherein the 3D tooth mask has a boundary that corresponds to an outline of the subject tooth;
    and wherein segmenting the subject tooth comprises segmenting the subject tooth within the 3D tooth mask to separate bone structure from soft structures that are internal to the tooth; and
    defining a 3D volume curvilinear shell of interest extending partly within the 3D tooth mask and analyzing features within at least a portion of the defined 3D volume curvilinear shell of interest, wherein the index varies according to the analyzed features within the portion of the defined 3D volume curvilinear shell of interest of the subject tooth.

2. The method of claim 1 further comprising displaying a cutting plane for viewing slices of the tooth that show one or more suspected fractures.

3. The method of claim 2 further comprising displaying a slice of the segmented subject tooth according to the computed cutting plane.

4. The method of claim 3 further comprising changing the display of the segmented subject tooth to a second slice within the volume image data according to an instruction entered by an operator.

5. The method of claim 2 further comprising changing the relative angle of the cutting plane in response to a plane angle adjustment instruction entered by an operator.

6. The method of claim 1 wherein the one or more operator instructions comprise a spline drawn on the displayed volume image data.

7. The method of claim 1 wherein one or more suspected fractures are highlighted in color.

8. The method of claim 1 wherein displaying the subject tooth further comprises using topological curvilinear splatting.

9. A method for analyzing a subject tooth, executed at least in part by a computer, comprising:
    obtaining volume image data including at least the subject tooth;
    segmenting the subject tooth from within the volume data according to one or more operator instructions entered on a display showing the at least the subject tooth;
    defining a 3D tooth mask for the segmented subject tooth, the 3D tooth mask having a boundary that corresponds to an outline of the subject tooth;
    segmenting the subject tooth within the 3D tooth mask to separate 3D bone structure from 3D soft structures that are internal to the tooth;
    defining a 3D volume curvilinear shell of interest extending within the 3D tooth mask and analyzing features within at least a portion of the defined 3D volume curvilinear shell of interest;
    generating an index indicative of a suspected fracture or other lesion identified for the segmented subject tooth for the analyzed portion of the defined 3D volume curvilinear shell of interest, wherein the index varies according to the relative depth or brightness of the suspected fracture or other lesion within the shell of interest of the subject tooth, and wherein the index is indicative of relative likelihood that the suspected fracture or other lesion exists for the segmented subject tooth; and
    displaying the subject tooth with the suspected fracture or other lesion highlighted and displaying the generated index.

10. The method of claim 9 further comprising displaying one or more of root canal material and pulp for the subject tooth according to operator instructions.

11. The method of claim 9 further comprising displaying a cutting plane for viewing slices of the subject tooth that show one or more suspected fractures or lesions.

12. The method of claim 11 further comprising displaying a slice of the segmented subject tooth according to the displayed cutting plane.

13. The method of claim 9 wherein the index is a first index and the suspected fracture or other lesion a first suspected fracture or other lesion, and further comprising generating a second index indicative of a second suspected fracture or other lesion identified for the segmented subject tooth.

14. A method for analyzing a subject tooth, executed at least in part by a computer, comprising:
    obtaining volume image data including at least the subject tooth;
    displaying an image showing at least the subject tooth and accepting one or more operator instructions that identify the displayed tooth and that indicate background content in the displayed image;

segmenting the subject tooth from within the volume data according to the one or more operator instructions;

defining a 3D tooth mask for the segmented subject tooth, the 3D tooth mask having a boundary that corresponds to an outline of the displayed subject tooth;

segmenting the subject tooth within the 3D tooth mask to distinguish 3D bone structure from 3D soft structures that are internal to the tooth;

defining a 3D volume curvilinear shell of interest extending within the 3D tooth mask and analyzing features within at least a portion of the defined 3D volume curvilinear shell of interest;

generating a numeric index indicative of a suspected fracture or other lesion identified for the segmented subject tooth for the analyzed portion of the defined 3D volume curvilinear shell of interest, wherein the numeric index varies according to the relative distance of the suspected fracture or other lesion to a boundary of the defined 3D tooth mask of the subject tooth, and wherein the numeric index is indicative of relative likelihood that the suspected fracture or other lesion exists for the segmented subject tooth; and displaying the subject tooth with the suspected fracture or other lesion highlighted and displaying the generated numeric index.

* * * * *